United States Patent [19]

Urban

[11] 4,250,153
[45] Feb. 10, 1981

[54] FLUE GAS TREATMENT
[75] Inventor: Peter Urban, Northbrook, Ill.
[73] Assignee: UOP Inc., Des Plaines, Ill.
[21] Appl. No.: 47,606
[22] Filed: Jun. 11, 1979
[51] Int. Cl.$^3$ .............................................. C01B 17/00
[52] U.S. Cl. .................................................. 423/242
[58] Field of Search .......... 423/242 A, 242 R, 244 A, 423/244 R, 326, 158

[56] References Cited
U.S. PATENT DOCUMENTS

| | | | |
|---|---|---|---|
| 2,088,281 | 7/1937 | Smith | 423/326 |
| 3,653,812 | 4/1972 | Schneider et al. | 423/242 |
| 3,971,844 | 7/1976 | Schneider | 423/242 |
| 3,989,797 | 11/1976 | Brady et al. | 423/242 |

OTHER PUBLICATIONS

The Condensed Chemical Dictionary 6 ed., 1962, 1053.

Primary Examiner—O. R. Vertiz
Assistant Examiner—Gregory A. Heller
Attorney, Agent, or Firm—James R. Hoatson, Jr.; Louis A. Morris; William H. Page, II

[57] ABSTRACT

An improved process for removing, by absorption, sulfur dioxide from a gaseous mixture such as a flue gas by scrubbing said mixture with an aqueous scrubbing liquor to which a solution of an alkaline reagent such as sodium carbonate is added to maintain alkalinity of the scrubbing liquor. The solution also has dissolved in it a quantity of silica which tends to precipitate when the solution is added to the scrubbing liquor. The silica precipitated in this manner tends to form extremely hard solid deposits in the scrubbing device and associated equipment. If a water soluble salt such as ferrous or ferric sulfate is added to the alkaline reagent solution prior to its use in the process, the precipitate formed has a minimum deleterious effect. The improvement to the process comprises the lowering of the pH of the alkaline reagent solution prior to the addition of the salt, thereby minimizing the amount of salt required.

9 Claims, No Drawings

FLUE GAS TREATMENT

BACKGROUND OF THE INVENTION

1. Field of the Invention

The field of art to which the claimed invention pertains is liquid-gas absorptive separations. More specifically, the claimed invention relates to a process for the absorptive removal of sulfur dioxide from a gaseous mixture by means of a scrubbing liquor.

2. Description of the Prior Art

Due to the ever increasing concern about air pollution, great efforts have been expended in recent years toward the development of processes to reduce the pollutants introduced into the atmosphere from various industrial operations. One of the most onerous of these pollutants is sulfur dioxide which is present in the stacks of flue gases from various operations. For example, $SO_2$ is a primary pollutant released into the atmosphere in the production of sulfuric acid. Also, great quantities of $SO_2$ are produced and passed to the atmosphere in the generating of power, particularly where the fuel used is high in sulfur content.

It has long been known to the art how to abate sulfur dioxide pollution of the atmosphere. The so-called "wet process" is probably the most commonly used process to accomplish such abatement. In the wet process the $SO_2$ containing gas mixture is contacted or "scrubbed" with water in which is dissolved or slurried a reagent, particularly an alkaline reagent, that chemically reacts with the $SO_2$, thus effecting the removal of the $SO_2$ from the gas mixture and incorporating the sulfur originally contained in the $SO_2$ into a non-volatile compound dissolved in the scrubbing water. The sulfur is ultimately removed from the system by the discarding of the scrubbing water in which it is contained, or by removal from the water by further processing.

The alkaline reagent perhaps best known to the art for use in the scrubbing solution for the above wet process is alkali metal carbonate or bicarbonate. The alkali metal carbonate or bicarbonate reacts with the $SO_2$ to yield alkali metal sulfite or bisulfite and $CO_2$. Use of the alkali metal carbonate and specifically sodium carbonate or bicarbonate is particularly advantageous because solutions of that compound are commonly available as an abundant mineral deposit (Trona) occurring in the western part of the United States, and as process-waste streams from industries such as metals production, textiles and paper making. The use of such streams not only cuts operating costs but also permits economies in the capital costs of wet processes because it eliminates the need for equipment to store and mix reagents obtained from other sources. Examples of prior art wet $SO_2$ scrubbing processes which utilize alkali metal carbonates are taught or claimed in U.S. Pat. Nos. 3,962,410; 3,963,825; 3,972,980; 3,984,529; and 3,987,147.

It has been observed that certain inexpensive sources of sodium carbonate or bicarbonate (soda liquor), such as that produced as a byproduct from the production of commercial grade sodium carbonate, contain quantities of silica which, when the soda liquor is used in the wet scrubbing process, precipitate and form deposits on the internals of the scrubbing apparatus. These deposits, which are extremely hard solids, interfere with the operation of the apparatus by eventually plugging the pipes and liquid circulating means which are a part of the apparatus. There is no practical way of removing these deposits.

Effective means of minimizing the deleterious effects of the presence of silica in the alkali reagent used in the wet $SO_2$ scrubbing process has been developed prior to this invention. Such means comprise the addition of a water soluble salt of a metal such as iron, cobalt, nickel, copper or aluminum to the soda liquor prior to the use of the soda liquor in the wet scrubbing process so as to effect a chemical reaction between the silica and salt to obtain a silicon containing material having a minimum deleterious effect when precipitated. I have discovered an improvement to these previously developed means which enables the minimization of the amount of salt required to be added to the soda liquor, or the maximization of the amount of silica that can be rendered innocuous by a given amount of salt.

SUMMARY OF THE INVENTION

It is, accordingly, a broad objective of my invention to provide an improvement to a process for the absorptive removal of sulfur dioxide from a gaseous mixture by minimizing the amount of water soluble salt required in the process for minimizing the deleterious effects of silica present in the scrubbing liquor used in the process, or maximizing the amount of silica that a given amount of salt will render innocuous.

In brief summary, my invention is a process for the absorptive removal of sulfur dioxide from a gaseous mixture by contacting the gaseous mixture in a scrubbing zone with a scrubbing liquor which comprises a buffered solution of an alkali metal sulfite and bisulfite. The alkalinity of the scrubbing liquor is maintained by adding to it an aqueous alkaline reagent solution having a relatively high pH with respect to the scrubbing liquor. The aqueous alkaline reagent solution has dissolved in it an undesirable quantity of silica contaminant which, upon the addition of the aqueous alkaline reagent solution to the scrubbing liquor, tends to precipitate from solution and form deleterious deposits. These deposits interfere with the functioning of the process. This interference is minimized by the addition of a water soluble acid salt of a metal selected from the group consisting of iron, cobalt, nickel, copper and aluminum to the aqueous alkaline reagent solution prior to the addition of the aqueous alkaline reagent solution to the scrubbing liquor, so as to effect a chemical reaction between the silica and acid salt to obtain a silicon containing material having a minimum deleterious effect when precipitated and relatively minor interference with the functioning of the process. The improvement to the process comprises the lowering of the pH of the aqueous alkaline reagent solution prior to the addition of the water soluble salt to the aqueous alkaline reagent solution, thereby minimizing the amount of the water soluble salt required for the reaction with the silica.

Other objectives and embodiments of my invention encompass details about feed mixtures, scrubbing liquors, and operating conditions, all of which are hereinafter disclosed in the following discussion of each of the facets of the present invention.

DESCRIPTION OF THE INVENTION

Sulfur dioxide contained in a gaseous mixture, such as a flue gas, may be removed from the gas in a scrubber by means of an aqueous alkaline reagent solution. The alkaline reagent used in the process of my invention is preferably alkali metal carbonate and bicarbonate and most preferably sodium carbonate and bicarbonate. The overall reaction that occurs when the sodium carbonate/bicarbonate is used is:

$$Na_2CO_3 (\text{or } NaHCO_3) + SO_2 \rightarrow Na_2SO_3 (\text{or } NaHSO_3) + CO_2$$

The $Na_2SO_3$ and $NaHSO_3$ are non-volatile and highly water soluble, thereby effectively precluding the possibility of reintroduction of the sulfur into the gaseous mixture in any form.

The typical inexpensive soda liquor source comprises a waste stream or by-product of a wide variety of industrial processes, such as the process for the mining of soda ash. These sources, particularly if obtained from the process for the mining of soda ash, frequently contain an undesirable quantity of silica as a contaminant. The silica will be present in the high pH soda liquor in the form of water soluble sodium silicate having the formula $Na_2OxSiO_2$, where x may be from 2 to 4. Silicate ions in a high pH aqueous solution tend to form polysilicic acid which comprises a molecular chain having up to four silicon atoms with an SiOH group on one or both ends of the chain.

The soda liquor obtained from the process for the mining of soda ash will contain about 30 wt.% sodium carbonate and about 1 wt.% silica calculated on the basis of silicon dioxide. The pH of this liquor will be about 11.5.

The typical flue gas scrubbing device comprises a vertically elongated chamber with means for introduction of the scrubbing liquor into the upper portion of the chamber and means for introduction of the flue gas into the lower portion. The liquor will be sprayed into the chamber and will flow downward through the chamber thereby coming into intimate contact with the up-flowing flue gas and thus enabling the absorption of the $SO_2$ from the flue gas into the liquor. The liquor drains out of the bottom of the chamber and is recirculated via pump and piping for reintroduction into the top portion of the chamber. A certain amount of the circulating liquor will be removed from the system and an amount of fresh alkaline reagent solution will be added to maintain the necessary alkalinity of the liquor.

The circulating scrubbing liquor will comprise a buffered solution of alkali metal sulfite and bisulfite having a pH from about 7.0 to about 8.0. The alkaline reagent solution which has a relatively high pH with respect to the scrubbing liquor, is added to the scrubbing liquor to maintain the pH of the scrubbing solution in the above range. The silica contained in the alkaline reagent solution will precipitate upon such addition due to insolubility of the silica in the scrubbing liquor at the relatively low pH of the scrubbing liquor. It is this precipitate which forms the aforementioned deleterious deposits on the internals of the scrubber and in the piping and associated equipment servicing the scrubber.

It is known that when a water soluble salt of a metal selected from the group consisting of iron, cobalt, nickel, copper and aluminum, is added to a silica containing alkaline reagent solution prior to the solution being added to the scrubbing liquor, $SiO_2$ will not be precipitated in the scrubbing liquor and the deleterious deposits will not be formed. Instead, a gelatinous silica containing material is precipitated in the alkaline reagent solution which, when compared to $SiO_2$, is almost completely innocuous. This gelatinous material need not be removed from the alkaline reagent solution prior to the addition of the solution to the scrubbing liquor.

This gelatinous material does not tend to form deposits, but largely remains in a colloidal suspension that has no effect on the scrubbing operation. The small amount of precipitate that is deposited adheres very loosely and is easily flushed from the system. Another co-pending application is Ser. No. 634,806 which also involves the addition of a water soluble acid of a metal.

It has been observed that the mole ratio of the silica contained in the scrubbing liquor to the metal contained in the acid salt may be somewhat greater than 1.0. This is because of the aforementioned formation of polysilicic acid, each molecule of which could, at high pH, contain up to four silicon atoms, but which has a maximum of only two reactive groups (SiOH). Thus, no more than two salt metallic ions will react with each molecule of polysilicic acid regardless of how many silicon atoms are in the molecule. It was previously observed that the addition of the acid salt to render the effects of silica innocuous was effective up to a silica to salt metal mole ratio of about 4.0:1.0.

I have found the addition of the water soluble salt to the aqueous alkaline reagent solution, in order to minimize the undesirable effects due to the presence of silica, to be far more effective when the pH of the alkaline reagent solution is first lowered. My meaning with regard to the term "more effective" is that the lowering of the pH enables a silica to salt metal mole ratio much greater than 4.0:1.0 while still achieving minimization of the undesirable effects of silica. I have found that my invention makes possible the mole ratio of total silica contained in the alkaline reagent solution to the metal in the added salt to be as high as about 40.0:1.0. The advantages of a high silica to metal is added salt ratio are that less salt is required to render innocuous a specific amount of silica and that there will be less dilution of the alkaline reagent solution by the solution in which the salt to be introduced is dissolved.

My hypothesis to explain the above advantageous effects of my invention relates to the properties of the silica dissolved in the soda liquor. As hereinbefore mentioned, the silica will be present in the high pH soda liquor in the form of water soluble sodium silicate having the formula $Na_2OxSiO_2$, where x may be from 2 to 4. As the pH is slightly lowered, however, as with the practice of my invention, long chain polymers of silica are formed having the formula $[Si(OH)_5.[Si(OH)_4]n-HSi(OH)_5]^{-2}.NaHCO_3$, with the possibility of many hundreds of silicon atoms being in each polymer. These long chain polymers are not in true solution, but take the form of colloids in the soda liquor. The silica not incorporated in the long chain polymer will remain in solution as short chain polysilicic acid. Since only two metallic ions of the salt will react with each molecule of polysilicic acid, regardless of the chain length, the mole ratio of silica originally contained in the alkaline reagent solution to metal contained in the added salt may be as high as about 40.0:1.0.

Perhaps the most surprising aspect of my invention is that when the aqueous alkaline reagent solution that has been treated in accordance with my invention is added to the scrubbing liquor, the very long chain polysilicic acid precipitated has no greater a deleterious effect on the functioning of the scrubbing process than the relatively short chain polysilicic acid precipitated.

When the aqueous alkaline reagent solution comprises the above disclosed soda liquor having a pH of 11.5, the lowering of the pH, in accordance with this invention only need be about 0.5 to 1.5 pH numbers. Possible means of lowering the pH of an aqueous alkaline reagent solution are by the addition of $SO_2$, $CO_2$, $HCO_3-$ ion or $HSO_3-$ ion. The preferred means, however, is by addition of scrubbing liquor. When scrubbing liquor is used, it is advantageous to age the alkaline reagent solution and scrubbing liquor mixture, prior to addition of the precipitating salt, for a period of time (about 1 to 30 minutes) so as to facilitate the formation of the long chain polysilicic polymers.

Salts and particularly sulfates of either aluminum or iron are preferred for use in this invention because of their effectiveness, availability and low cost. The iron salts, however, both in the ferrous and ferric form, are particularly preferred because of the ease by which they are introduced into the alkaline reagent solution. In all cases, this invention contemplates the addition of the salt, to the alkaline reagent solution, dissolved in an aqueous solution. An aqueous solution of salt of aluminum needs to be added into a mixing area of high shear, such as the nozzle area of an homogenizer, because of the tendency of the aluminum salt to polymerize upon alkylation. The salts of iron do not have as great a tendency to polymerize in solution and therefore do not require as high an input of mixing energy.

The following examples are intended to further illustrate the process of this invention and are not to be construed as unduly limiting the scope and spirit of said process.

EXAMPLE I

The purpose of this example is to illustrate the effect, in accordance with this invention, of the lowering of the pH of seven different samples of soda liquor comprising an aqueous solution of 30 wt.% sodium carbonate and 4100 parts per million by weight (ppm), calculated on the basis of elemental silicon, of silica. The pH of the soda liquor was originally 11.5. Lowering of the pH of the soda liquor was effected by the addition of an adsorber recycle liquid (scrubbing liquor). The following data was obtained:

| Ratio of Adsorber Recycle Liquid to Soda Liquor | Equilibrium pH | Remaining Soluble Silica Conc. (ppm) | % Silica Removal From Solution |
|---|---|---|---|
| 3:1 | 10.7 | 1040 | 55.9 |
|  | 10.7 | 1070 | 54.6 |
| 4:1 | 10.7 | 940 | 52.2 |
| 5:1 | 10.4 | 770 | 54.9 |
| 7:1 | 10.3 | 530 | 61.6 |
|  | 10.2 | 550 | 60.1 |
| 10:1 | 10.2 | 600 | 46.1 |
|  | 10.1 | 530 | 52.4 |
| 12:1 | 9.9 | 490 | 51.2 |
| 15:1 | 9.8 | 500 | 45.9 |

It can be seen from the foregoing data that there is a dramatic reduction in soluble silica in the soda liquor upon lowering of the pH in accordance with this invention. Furthermore, it is apparent that the pH need not be lowered substantially in excess of 1.0 pH numbers for such reduction to occur. The silica was apparently removed from solution as a long chain polysilicic acid visible as a flock or colloid.

EXAMPLE II

The purpose of this example is to present results of a test run for the practice of the present invention on a pilot plant scale $SO_2$ scrubber. Also presented are comparative results of test runs of prior art processes carried out on the same scrubber.

In the pilot plant $SO_2$ scrubber, sulfur dioxide was absorbed out of an $SO_2$ air mixture by an aqueous solution of sodium sulfite-bisulfite which comprised the scrubbing liquor. The pH of the scrubbing liquor was maintained by the addition of an aqueous alkaline reagent solution (soda liquor) comprising a solution of sodium carbonate contaminated by some soluble silica and diluted with deionized water to give a specific gravity of 1.2. Plant conditions and charge streams for each test run were as follows:

Temperature: 50°-55° C.
Recycle rate: 300 gals./hour.
Time: 48 hours
$SO_2$ in: 1.0 to 1.2 moles (no $SO_2$ out).
Initial charge of absorber recycle solution: 5000 grams.
Air: 1 SCFM
Concentration of solids in absorber recycle Sol: 20%, Density 1.2 (specific gravity).

The test runs on the pilot plant are summarized as follows:

1. A control run in which neither a water soluble salt was added to the aqueous alkaline reagent solution, nor in which was lowering of the pH effected in accordance with the present invention.
2. Same as the control run except iron sulfate was added to the aqueous alkaline reagent solution prior to the addition of that solution to the scrubbing liquor.
3. The practice of the present invention in accordance with which the pH of the aqueous alkaline reagent solution was reduced from 11.5 to 11.0 by the addition thereto of absorber recycle liquor and carbon dioxide followed by the addition of iron sulfate. Following is a compilation of the data from the three runs:

| | Soda Liquor Charge | | | | |
|---|---|---|---|---|---|
| Run No. | Grams | pH | Si-Total Moles | Si Soluble ppm After Addition of Fe | Si/Fe Moles |
| 1 | 18,470 | 11.5 | 1.60 | 2423 | — |
| 2 | 18,768 | 11.5 | 1.53 | 1298 | 8 |
| 3 | 21,472 | 11.0 | 1.37 | 622 | 7.3 |

| | Residual Si In Plant After Test | |
|---|---|---|
| Run No. | Moles Si Recovered by Caustic Wash | % of Si Charge Contributing to Scale Formation in Scrubber |
| 1 | 1.23 | 77 |
| 2 | 0.4 | 26 |
| 3 | 0.23 | 17 |

The effectiveness of the present invention is readily apparent from the above data. A lowering of the pH of the soda liquor by only 0.5 pH numbers resulted in a reduction of soluble silica after addition of the iron sulfate of over 50%. Although the silica to iron ratio was not substantially different in the second and third runs, in the third run, i.e. the run in which the pH of the soda liquor was lowered in accordance with the present invention, the amount of silica deposits in the scrubbing apparatus (determined by subsequent caustic wash) was reduced almost by a factor of four-fifths as compared to the control run and almost by a factor of one-half as compared to the deposits made during the second run. The present invention also achieved a substantial reduction in the percent of silica charge in the soda liquor contributing to scale formation in the scrubber.

I claim as my invention:

1. In a process for the absorptive removal of sulfur dioxide from a gaseous mixture by contacting said gaseous mixture in a scrubbing zone with a scrubbing liquor comprising a buffered solution of an alkali metal sulfite and bisulfite, the alkalinity of said scrubbing liquor being maintained by the addition thereto of an aqueous alkaline reagent solution comprising sodium carbonte, sodium bicarbonate or a mixture of both having a relatively high pH with respect to said scrubbing liquor, said aqueous alkaline reagent solution having dissolved therein an undesirable quantity of silica contaminant which, upon the addition of said aqueous alkaline reagent solution to said scrubbing liquor, tends to precipitate from solution and form deleterious deposits which interfere with the functioning of said process, said interference being minimized by the addition of a water soluble salt of a metal selected from the group consisting of iron, cobalt, nickel, copper and aluminum to said aqueous alkaline reagent solution prior to the addition of said aqueous alkaline reagent solution to said scrubbing liquor thereby effecting a chemical reaction between said silica and said salt to obtain a silicon containing material having a minimum deleterious effect when precipitated, the improvement which comprises the lowering of the pH of said aqueous alkaline reagent solution about 0.5 to about 1.5 pH numbers prior to said addition of said water soluble salt to said aqueous alkaline reagent solution, thereby minimizing the amount of said water soluble salt required for said reaction with said silica.

2. The process of claim 1 further characterized in that said gaseous mixture comprises a flue gas.

3. The process of claim 1 further characterized in that said aqueous alkaline reagent solution comprises an aqueous solution having a pH of about 11.5 and containing about 30 wt.% sodium carbonate and about 1 wt.% silica calculated on the basis or silicon dioxide.

4. The process of claim 3 further characterized in that the pH of said scrubbing liquor may range from about 7.0 to about 8.0 during said contacting with said gaseous mixture.

5. The process of claim 1 further characterized in that said salt comprises aluminum sulfate, ferrous sulfate or ferric sulfate.

6. The process of claim 1 further characterized in that the quantity of said acid salt added to said alkaline reagent solution is such that the mole ratio of silica contained in said alkaline reagent solution to said metal contained in said added salt may not exceed 40.0:1.0.

7. The process of claim 1 further characterized in that said pH of said aqueous alkaline reagent solution is lowered by the addition thereto of a quantity of said scrubbing liquor.

8. The process of claim 1 further characterized in that said pH of said aqueous alkaline reagent solution is lowered by the addition thereto of $SO_2$, $CO_2$, $HCO_3$ ion or $HSO_3$ ion.

9. The process of claim 1 further characterized in that said aqueous alkaline reagent solution is aged from about 1 to about 30 minutes following said lowering of the pH and prior to said addition of said water soluble salt.

* * * * *